United States Patent
Hotson et al.

(10) Patent No.: US 10,482,572 B2
(45) Date of Patent: Nov. 19, 2019

(54) FUSION OF MOTION AND APPEARANCE FEATURES FOR OBJECT DETECTION AND TRAJECTORY PREDICTION

(71) Applicant: Ford Global Technologies, LLC, Dearborn, MI (US)

(72) Inventors: Guy Hotson, Palo Alto, CA (US); Gintaras Vincent Puskorius, Novi, MI (US); Vidya Nariyambut Murali, Sunnyvale, CA (US); Gaurav Kumar Singh, Westland, MI (US); Pol Llado, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 117 days.

(21) Appl. No.: 15/727,325

(22) Filed: Oct. 6, 2017

(65) Prior Publication Data

US 2019/0108613 A1    Apr. 11, 2019

(51) Int. Cl.
| | |
|---|---|
| *G06K 9/00* | (2006.01) |
| *G06T 3/00* | (2006.01) |
| *G06T 7/246* | (2017.01) |
| *G06T 7/00* | (2017.01) |
| *G06T 5/50* | (2006.01) |

(52) U.S. Cl.
CPC .............. *G06T 3/0087* (2013.01); *G06K 9/00* (2013.01); *G06T 5/50* (2013.01); *G06T 7/0008* (2013.01); *G06T 7/248* (2017.01); *G06T 2207/20076* (2013.01); *G06T 2207/20084* (2013.01); *G06T 2207/20221* (2013.01); *G06T 2207/30236* (2013.01); *G06T 2207/30241* (2013.01); *G06T 2207/30252* (2013.01)

(58) Field of Classification Search
CPC . G06T 2207/20084; G06T 2207/30236; G06T 2207/20076; G06T 7/248; G06T 7/0008; G06T 3/0087
See application file for complete search history.

(56) References Cited

U.S. PATENT DOCUMENTS

| | | | |
|---|---|---|---|
| 8,345,984 B2 | 1/2013 | Ji | |
| 8,948,448 B2 | 2/2015 | Iwasaki | |
| 9,213,901 B2 | 12/2015 | Bernal | |
| 2005/0073585 A1* | 4/2005 | Ettinger | H04N 7/18 348/155 |
| 2016/0049017 A1* | 2/2016 | Busse | G07C 5/008 701/33.3 |

(Continued)

FOREIGN PATENT DOCUMENTS

| | | |
|---|---|---|
| CN | 105678216 A | 6/2016 |
| CN | 106650655 A | 5/2017 |
| CN | 106897714 A | 6/2017 |

*Primary Examiner* — Amara Abdi
(74) *Attorney, Agent, or Firm* — David R. Stevens; Stevens Law Group (57) ABSTRACT

Techniques and examples pertaining to objection detection and trajectory prediction for autonomous vehicles are described. A processor receives an input stream of image frames and fuses a spatiotemporal input stream of the image frames and an appearance-based stream of the image frames using a deep neural network (DNN) to generate an augmented stream of the image frames. The processor performs object detection and trajectory prediction of one or more objects in the image frames based on the augmented stream.

20 Claims, 4 Drawing Sheets

(56) References Cited

U.S. PATENT DOCUMENTS

| | | |
|---|---|---|
| 2016/0132728 A1 | 5/2016 | Choi |
| 2017/0371329 A1* | 12/2017 | Giering .............. G05B 23/0254 |
| 2018/0005676 A1* | 1/2018 | Neil ........................ G11C 11/54 |
| 2018/0181860 A1* | 6/2018 | Verbist .................. B60W 40/09 |
| 2019/0034814 A1* | 1/2019 | Amer ..................... G06N 20/00 |

* cited by examiner

FUSION OF MOTION AND APPEARANCE FEATURES FOR OBJECT DETECTION AND TRAJECTORY PREDICTION

TECHNICAL FIELD

The present disclosure generally relates to autonomous vehicles and, more particularly, to a system of objection detection and trajectory prediction for autonomous vehicles.

BACKGROUND

Autonomous vehicles are generally capable of sensing the environment and navigating without human input. As a requirement, autonomous vehicles need to be able to attend to and classify potentially moving objects in dynamic surroundings. However, the capability of tracking multiple objects within video sequences and predicting where the multiple objects are going to be located in the future remains a challenge. While existing efforts attained results in predicting trajectories of an object based on previous locations of the object, the models used tend to lack the capability to extract spatiotemporal feature dynamics from videos to enhance detections and improve trajectory predictions for object tracking.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

State of the art object detection within images and videos has focused on first extracting feature maps from static images and then feeding the extracted feature maps into classification and regression models for object detection, classification and localization, respectively. Under proposed schemes and concepts in accordance with the present disclosure, a spatiotemporal motion input stream (herein interchangeably referred as "spatiotemporal input stream") may be utilized to augment an RGB appearance-based stream for enhanced object detection and trajectory prediction within videos/image frames. A focus of the proposed schemes and concepts in accordance with the present disclosure is on the use of deep convolutional neural networks for fusing a spatiotemporal input stream and the appearance-based stream in order to predict future object locations.

The spatiotemporal input stream may be derived, for example and without limitation, from optical flow calculations, spatiotemporal filters and/or network stream specialized in extracting motion information. The input streams may be derived from RGB image sequences, and may encode motion information derived from how pixels are changing from frame to frame. For instance, a dense optical flow may track the angle and magnitude of how each pixel moves between sequential frames.

Figure 1:
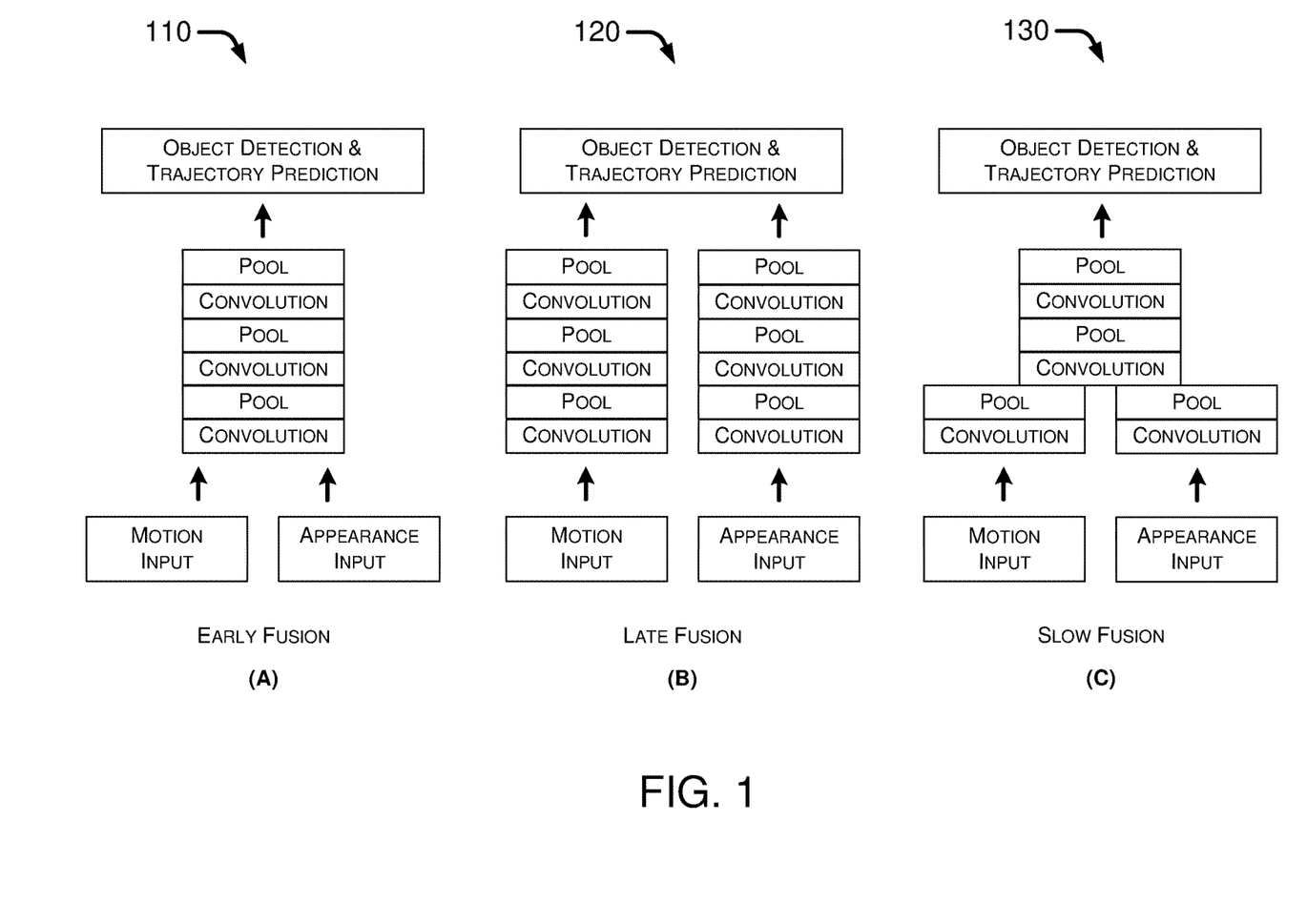
FIG. 1 is a diagram depicting example architectures with which embodiments in accordance with the present disclosure may be utilized.

FIG. 1 illustrates example architectures 110, 120 and 130 with which two input streams can be combined in accordance with an embodiment of the present disclosure. FIG. 1 shows conceptually how two input streams of image frames may be combined or otherwise fused together within a shallow convolutional neural network (CNN) composed of alternating convolutional and pooling layers. The two input streams may include a spatiotemporal input stream of image frames and an appearance-based stream of image frames, and may be concatenated for use by utilizing architectures 110, architectures 120 or architectures 130.

Referring to part (A) of FIG. 1, architecture 110 is herein referred as an "early-fusion" architecture. In architecture 110, the two input streams (e.g., a spatiotemporal input stream of image frames and an appearance-based stream of image frames), labeled as "motion input" and "appearance input" in FIG. 1, may be stacked as inputs for object detection and trajectory prediction without any individual processing by the CNN.

Referring to part (B) of FIG. 1, architecture 120 is herein referred as a "late-fusion" architecture. In architecture 120, the two input streams (e.g., a spatiotemporal input stream of image frames and an appearance-based stream of image frames), labeled as "motion input" and "appearance input" in FIG. 1, may be processed by the CNN in two separate streams/stacks to create two separate sets of feature maps that are combined before object detection and trajectory prediction.

Referring to part (C) of FIG. 1, architecture 130 is herein referred as a "slow-fusion" architecture. In architecture 130, the two input streams (e.g., a spatiotemporal input stream of image frames and an appearance-based stream of image frames), labeled as "motion input" and "appearance input" in FIG. 1, may be processed individually for a few convolutional and pooling layers and then processed together in a single stack before object detection and trajectory prediction.

The combining or fusion of the appearance-based stream and the spatiotemporal input stream may be enhanced with recurrent connections. Connections of recurrent neural networks (RNNs) may enable the networks to use outputs from previous image frames as inputs to current image frames, and thus allow neutral networks to maintain state information. For example, in an event that a network detects a vehicle at a location within a current image frame, the current state of the network may be impacted and it may be more likely for the network to detect the vehicle at that location in a subsequent image frame. Recurrent connections may be utilized within the convolutions of RNNs employed for feature extraction. By maintaining state information, the network(s) may aggregate motion information over time to aid in future predictions.

Figure 2:
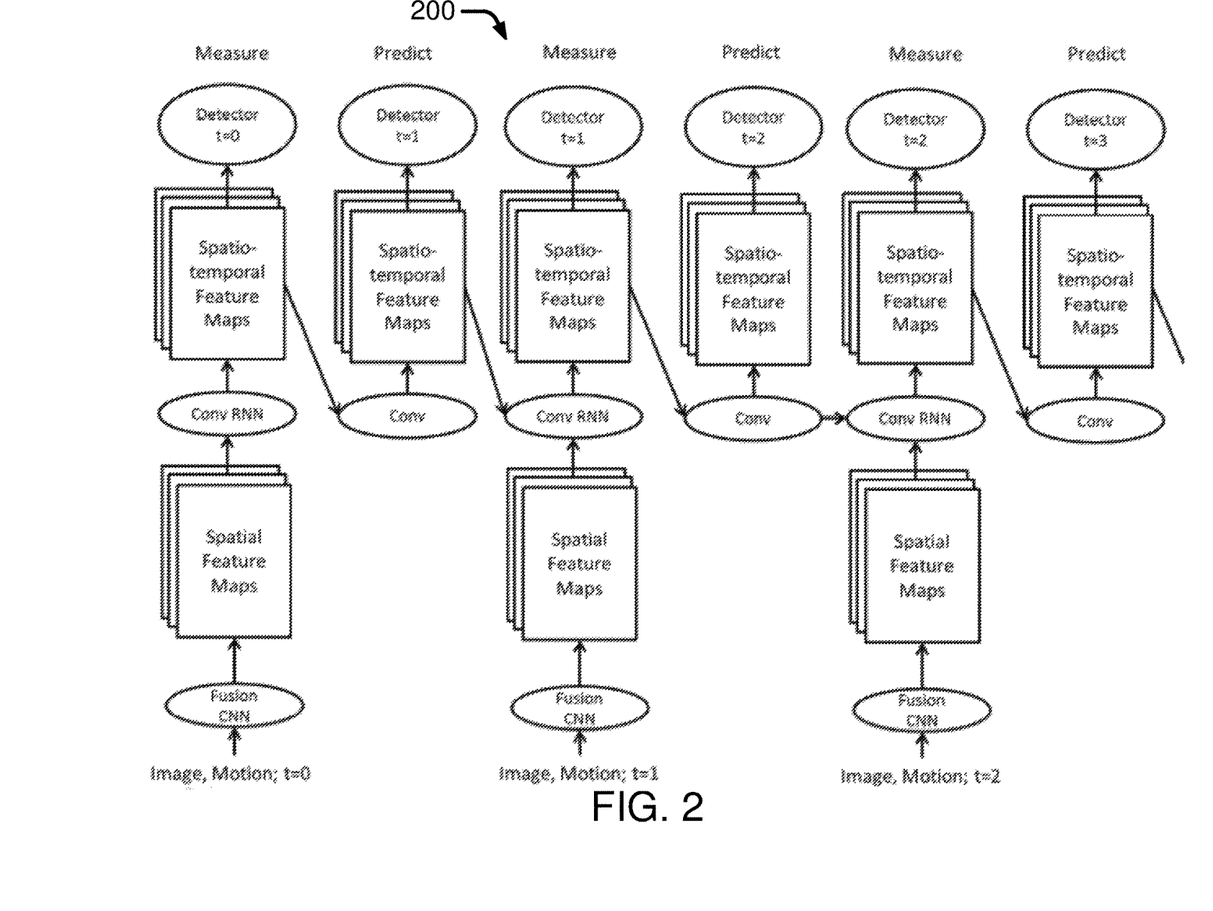
FIG. 2 is a diagram depicting an example scenario in which embodiments in accordance with the present disclosure may be utilized.

FIG. 2 illustrates an example scenario 200 in which embodiments in accordance with the present disclosure may be utilized. Scenario 200 is an illustrative and non-limiting example of how recurrent connections may be implemented for prediction of object bounding boxes one time step in the future. Recurrent connections may also be used during the final stage of object classification and trajectory prediction.

Referring to FIG. 2, at time t=0, two input streams (e.g., a spatiotemporal input stream of image frames and an appearance-based stream of image frames), labeled as "motion" and "image" in FIG. 2, may be fused by a CNN to create a first set of spatial feature maps, which may be provided as inputs to a convolutional RNN to create a first set of spatiotemporal feature maps as inputs to a detector at time t=0 for measurement. At time t=1, the first set of spatiotemporal feature maps may be processed by convolutions to provide a second set of spatiotemporal feature maps as inputs to a detector at time t=1 for prediction. Also, at time t=1, two input streams (e.g., a spatiotemporal input stream of image frames and an appearance-based stream of image frames), labeled as "motion" and "image" in FIG. 2, may be fused by a CNN to create a second set of spatial feature maps, which may be provided along with the second set of spatiotemporal feature maps as inputs to a convolutional RNN to create a third set of spatiotemporal feature maps as inputs to a detector at time t=1 for measurement. At time t=2, the third set of spatiotemporal feature maps may be processed by convolutions to provide a fourth set of spatiotemporal feature maps as inputs to a detector at time t=2 for prediction. Also, at time t=2, two input streams (e.g., a spatiotemporal input stream of image frames and an appearance-based stream of image frames), labeled as "motion" and "image" in FIG. 2, may be fused by a CNN to create a third set of spatial feature maps, which may be provided along with the fourth set of spatiotemporal feature maps as inputs to a convolutional RNN to create a fifth set of spatiotemporal feature maps as inputs to a detector at time t=2 for measurement. At time t=3, the fifth set of spatiotemporal feature maps may be processed by convolutions to provide a sixth set of spatiotemporal feature maps as inputs to a detector at t=3 for prediction. The above-described operations may continue as recurrence.

Figure 3:
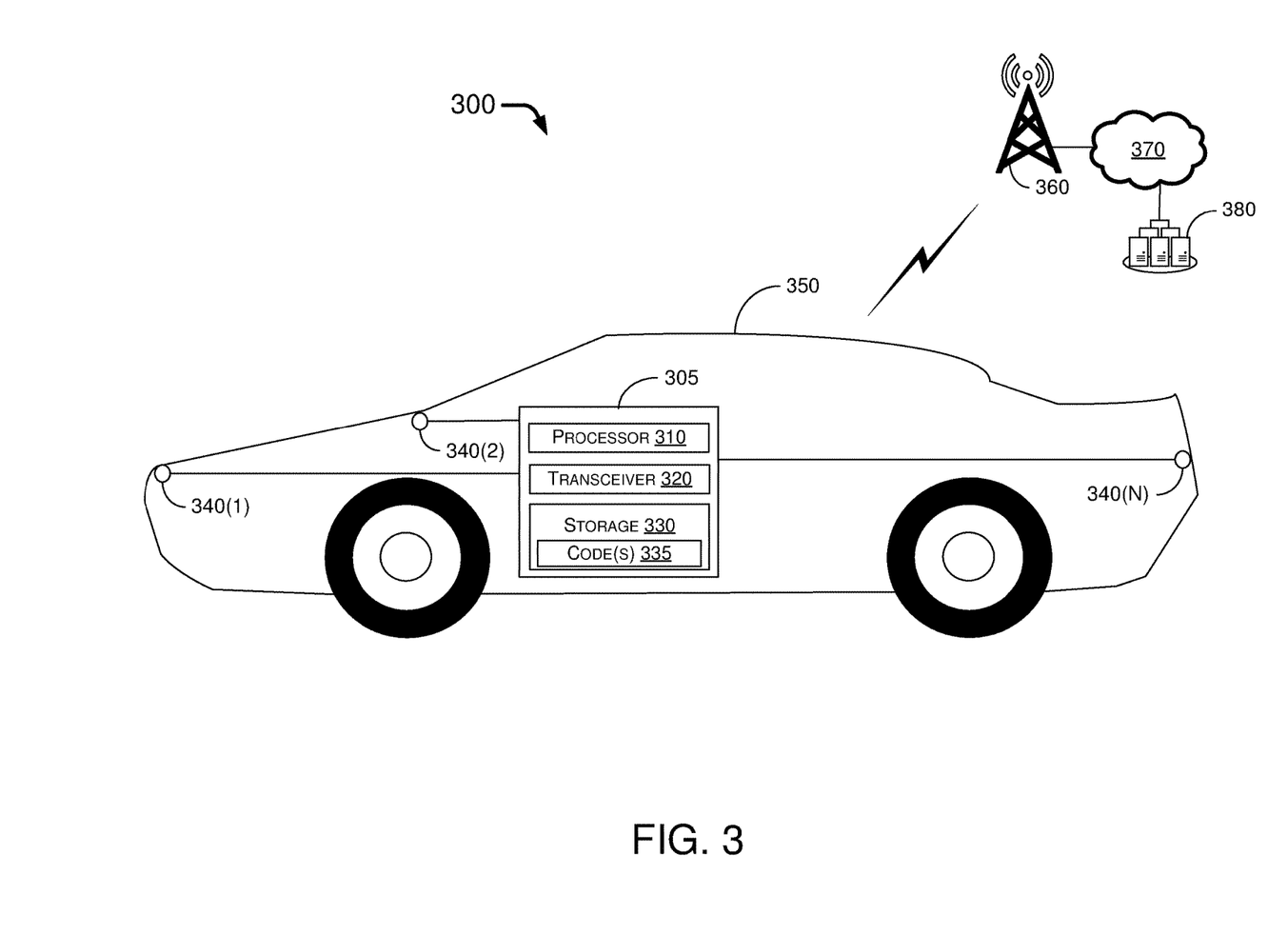
FIG. 3 is a block diagram depicting an example system in accordance with an embodiment of the present disclosure.

FIG. 3 illustrates an example system 300 in accordance with an embodiment of the present disclosure. System 300 may include a vehicle 350 which may be an autonomous vehicle or a manually-driven vehicle. Vehicle 350 may include an apparatus 305, which may be an electronic control unit (ECU) of vehicle 350. Apparatus 305 may include a processor 310. In some embodiments, apparatus 305 may also include one or more image sensors 340(1)-340(N), with N being a positive integer equal to or greater than 1. Each of the one or more image sensors 340(1)-340(N) may be, for example and without limitation, a charge-coupled device (CCD) or complementary metal-oxide semiconductor (CMOS) image sensor, and may be capable of capturing one or more video images. The captured video images may be toward the front of vehicle 350, the rear of vehicle 350 and/or any suitable direction(s) around vehicle 350.

Processor 310 may be communicatively coupled to each of the one or more image sensors 340(1)-340(N) via wireless and/or wired medium(s) to receive the video images from the one or more image sensors 340(1)-340(N) as an input stream of image frames. Processor 310 may generate a spatiotemporal input stream of the image frames from the received stream of the image frames, and generate an appearance-based stream (e.g., RGB appearance-based stream) of the image frames from the received stream of the image frames. Processor 310 may then combine or otherwise fuse the spatiotemporal input stream of the image frames and the appearance-based stream of the image frames using one or more deep neural network (DNNs) to generate an augmented stream of the image frames. For instance, in fusing the spatiotemporal input stream of the image frames and the appearance-based stream of the image frames using the DNN, processor 310 may augment the appearance-based stream of the image frames with the spatiotemporal input stream of the image frames to generate the augmented stream of the image frames. In generating the spatiotemporal input stream of the image frames, processor 310 may perform either of the following: (1) generating the spatiotemporal input stream of the image frames using optical flow calculations and spatiotemporal filters; or (2) generating the spatiotemporal input stream of the image frames using a network stream which is adapted to extract motion information from the input stream of the image frames. With the augmented stream of the image frames, processor 310 may perform object detection and trajectory prediction of one or more objects in the image frames based on the augmented stream.

In some embodiments, in fusing the spatiotemporal input stream of the image frames and the appearance-based stream of the image frames using the DNN, processor 310 may fuse the spatiotemporal input stream of the image frames and the appearance-based stream of the image frames using a convolutional neural network (CNN) that concatenates the spatiotemporal input stream and the appearance-based stream.

In some embodiments, in fusing the spatiotemporal input stream of the image frames and the appearance-based stream of the image frames using the DNN, processor 310 may concatenate the spatiotemporal input stream of the image frames and the appearance-based stream of the image frames using the DNN with an early-fusion architecture in which the spatiotemporal input stream and the appearance-based stream are separately stacked, without individual processing, as inputs for object detection and trajectory prediction. Alternatively, in fusing the spatiotemporal input stream of the image frames and the appearance-based stream of the image frames using the DNN, processor 310 may concatenate the spatiotemporal input stream of the image frames and the appearance-based stream of the image frames using the DNN with a late-fusion architecture in which the spatiotemporal input stream and the appearance-based stream are processed in two separate streams to create two separate sets of feature maps that are combined to form an input for object detection and trajectory prediction. Alternatively, in fusing the spatiotemporal input stream of the image frames and the appearance-based stream of the image frames using the DNN, processor 310 may concatenate the spatiotemporal input stream of the image frames and the appearance-based stream of the image frames using the DNN with a slow-fusion architecture in which the spatiotemporal input stream and the appearance-based stream are processed separately for one or more layers before being combined to form an input for object detection and trajectory prediction.

In some embodiments, in fusing the spatiotemporal input stream of the image frames and the appearance-based stream of the image frames using the DNN, processor 310 may fuse the spatiotemporal input stream of the image frames and the appearance-based stream of the image frames using recurrent neural networks (RNNs) with recurrent connections to utilize outputs from a previous video frame of the image frames as inputs to a current video frame of the image frames.

In some embodiments, apparatus 305 may also include a storage device 330 (e.g., a memory device) that stores one or more sets of processor-executable instructions or codes 335 therein. Processor 310 may execute the instructions or codes 335 to render the DNN, CNN and/or RNNs to perform the above-described operations.

In some embodiments, the DNN, CNN and/or RNNs may be implemented in or otherwise executed by one or more remote servers 380. In such cases, apparatus 305 may include a transceiver 320 capable of wirelessly communicating with the one or more remote servers 380, which is connected to a network 370, via base station 360. In some embodiments, transceiver 320 may wirelessly communicate directly with base station 360. Alternatively or additionally, transceiver 320 may wirelessly communicate indirectly with base station 360 via one or more other vehicles (not shown) and/or one or more other base stations (not shown). That is, transceiver 320 may be capable of wireless communications using one or more radio access technologies and in compliance with one or more wireless communications protocols, standards and specifications.

Figure 4:
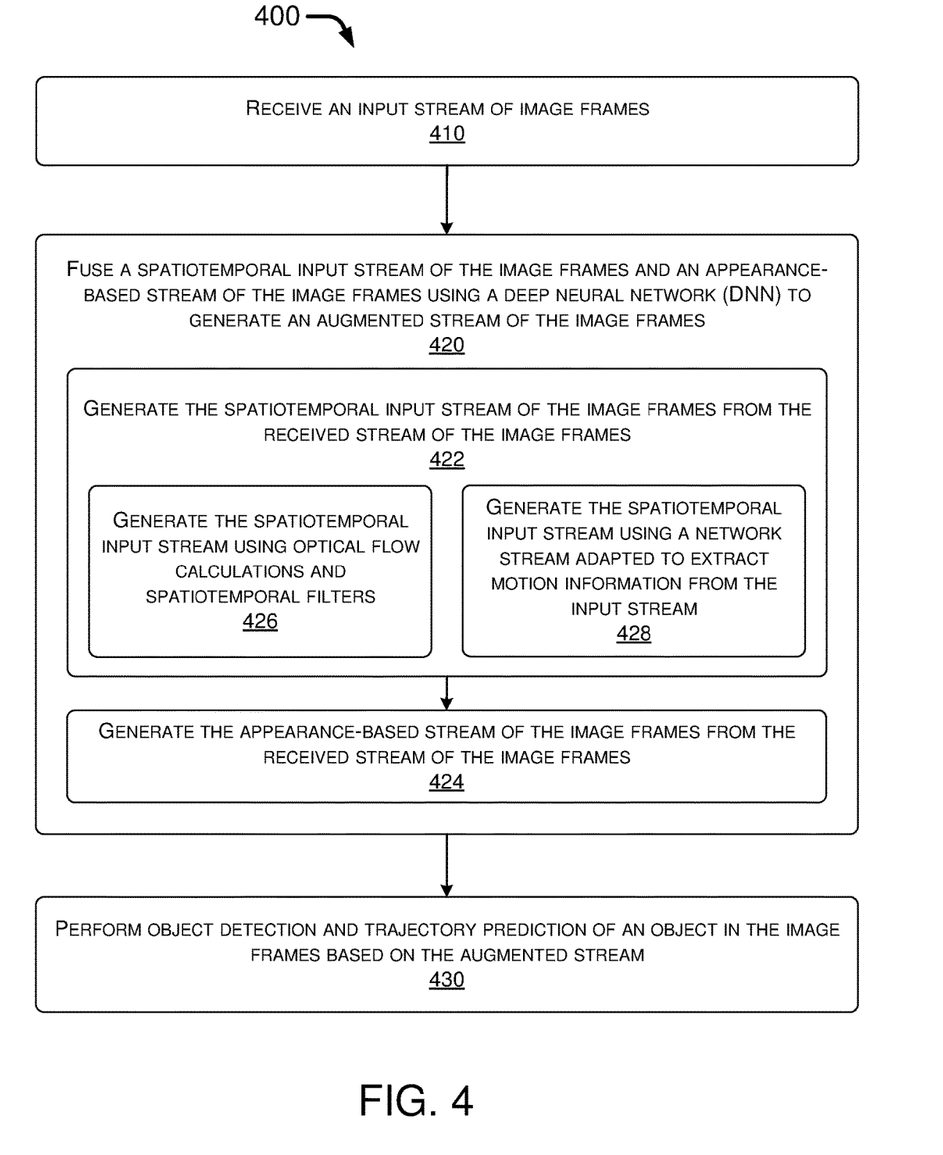
FIG. 4 is a flowchart depicting an example process in accordance with an embodiment of the present disclosure.

FIG. 4 illustrates an example process 400 in accordance with the present disclosure. Process 400 may include one or more operations, actions, or functions shown as blocks such as 410, 420 and 430 as well as sub-blocks 422, 424, 426 and 428. Although illustrated as discrete blocks, various blocks of process 400 may be divided into additional blocks, combined into fewer blocks, or eliminated, depending on the desired implementation. The blocks of process 400 may be implemented in the order shown in FIG. 4 and, alternatively, in a different order. Process 400 may be implemented by or in apparatus 300. Process 400 may begin with block 410.

At 410, process 400 may involve processor 310 of apparatus 300 receiving an input stream of image frames. Process 400 may proceed from 410 to 420.

At 420, process 400 may involve processor 310 fusing a spatiotemporal input stream of the image frames and an appearance-based stream of the image frames (e.g., RGB appearance-based stream) using a deep neural network (DNN) to generate an augmented stream of the image frames. In some embodiments, in fusing the spatiotemporal input stream of the image frames and the appearance-based stream of the image frames using the DNN, process 400 may involve processor 310 performing a number of operations as represented by sub-blocks 422, 424, 426 and 428 to be described below. Process 400 may proceed from 420 to 430.

At 430, process 400 may involve processor 310 performing object detection and trajectory prediction of one or more objects in the image frames based on the augmented stream. For example, based on the augmented stream, processor 310 may detect one or more objects in the image frames and then determine or otherwise predict a path of movement, a trajectory or a location at a future time for each of the one or more objects.

At 422, process 400 may involve processor 310 generating the spatiotemporal input stream of the image frames from the received stream of the image frames. In some embodiments, in generating the spatiotemporal input stream of the image frames from the received stream of the image frames, process 400 may involve processor 310 performing either an operation represented by sub-block 426 or another operation represented by sub-block 428. Process 400 may proceed from 422 to 424.

At 424, process 400 may involve processor 310 generating the appearance-based stream of the image frames from the received stream of the image frames.

At 426, process 400 may involve processor 310 generating the spatiotemporal input stream of the image frames using optical flow calculations and spatiotemporal filters.

At 428, process 400 may involve processor 310 generating the spatiotemporal input stream of the image frames using a network stream which is adapted to extract motion information from the input stream of the image frames.

In some embodiments, in receiving the input stream of the image frames, process 400 may involve processor 310 receiving the input stream of the image frames from one or more image sensors on a vehicle (e.g., from one or more image sensors 340(1)-340(N)).

In some embodiments, in fusing the spatiotemporal input stream of the image frames and the appearance-based stream of the image frames using the DNN, process 400 may involve processor 310 augmenting, using the DNN, the appearance-based stream of the image frames with the spatiotemporal input stream of the image frames to generate the augmented stream of the image frames.

In some embodiments, in fusing the spatiotemporal input stream of the image frames and the appearance-based stream of the image frames using the DNN, process 400 may involve processor 310 fusing the spatiotemporal input stream of the image frames and the appearance-based stream of the image frames using a CNN that concatenates the spatiotemporal input stream and the appearance-based stream.

In some embodiments, in fusing the spatiotemporal input stream of the image frames and the appearance-based stream of the image frames using the DNN, process 400 may involve processor 310 concatenating the spatiotemporal input stream of the image frames and the appearance-based stream of the image frames using the DNN with an early-fusion architecture in which the spatiotemporal input stream and the appearance-based stream are separately stacked, without individual processing, as inputs for object detection and trajectory prediction.

In some embodiments, in fusing the spatiotemporal input stream of the image frames and the appearance-based stream of the image frames using the DNN, process 400 may involve processor 310 concatenating the spatiotemporal input stream of the image frames and the appearance-based stream of the image frames using the DNN with a late-fusion architecture in which the spatiotemporal input stream and the appearance-based stream are processed in two separate streams to create two separate sets of feature maps that are combined to form an input for object detection and trajectory prediction.

In some embodiments, in fusing the spatiotemporal input stream of the image frames and the appearance-based stream of the image frames using the DNN, process 400 may involve processor 310 concatenating the spatiotemporal input stream of the image frames and the appearance-based stream of the image frames using the DNN with a slow-fusion architecture in which the spatiotemporal input stream and the appearance-based stream are processed separately for one or more layers before being combined to form an input for object detection and trajectory prediction.

In some embodiments, in fusing the spatiotemporal input stream of the image frames and the appearance-based stream of the image frames using the DNN, process 400 may involve processor 310 fusing the spatiotemporal input stream of the image frames and the appearance-based stream of the image frames using RNNs with recurrent connections to utilize outputs from a previous video frame of the image frames as inputs to a current video frame of the image frames.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
receiving, by a processor, an input stream of image frames;
fusing, by the processor, a spatiotemporal input stream of the image frames and an appearance-based stream of the image frames using a deep neural network (DNN) to generate an augmented stream of the image frames; and
performing, by the processor, object detection and trajectory prediction of an object in the image frames based on the augmented stream,
wherein the fusing of the spatiotemporal input stream of the image frames and the appearance-based stream of the image frames comprising fusing the spatiotemporal input stream of the image frames and the appearance-based stream of the image frames with either of a late fusion architecture and a slow fusion architecture,
wherein the late fusion architecture involves:
processing the spatiotemporal input stream and the appearance-based stream through two separate stacks each comprising alternating convolutional layers and pooling layers to create two separate sets of feature maps; and
combining the two sets of feature maps, and
wherein the slow fusion architecture involves:
processing each of the spatiotemporal input stream and the appearance-based stream individually through a convolutional layer and a pooling layer; and
further processing the spatiotemporal input stream and the appearance-based stream together through a single stack comprising alternating convolutional layers and pooling layers.

2. The method of claim 1, wherein the receiving of the input stream of the image frames comprises receiving the input stream of the image frames from one or more image sensors on a vehicle.

3. The method of claim 1, wherein the fusing of the spatiotemporal input stream of the image frames and the appearance-based stream of the image frames using the DNN comprises augmenting the appearance-based stream of the image frames with the spatiotemporal input stream of the image frames to generate the augmented stream of the image frames.

4. The method of claim 1, wherein the fusing of the spatiotemporal input stream of the image frames and the appearance-based stream of the image frames using the DNN comprises:
generating, by the processor, the spatiotemporal input stream of the image frames from the received stream of the image frames; and
generating, by the processor, the appearance-based stream of the image frames from the received stream of the image frames.

5. The method of claim 4, wherein the generating of the spatiotemporal input stream of the image frames comprises performing either of:

generating the spatiotemporal input stream of the image frames using optical flow calculations and spatiotemporal filters; or
generating the spatiotemporal input stream of the image frames using a network stream which is adapted to extract motion information from the input stream of the image frames.

6. The method of claim 1, wherein the fusing of the spatiotemporal input stream of the image frames and the appearance-based stream of the image frames using the DNN comprises fusing the spatiotemporal input stream of the image frames and the appearance-based stream of the image frames using a convolutional neural network (CNN) that concatenates the spatiotemporal input stream and the appearance-based stream.

7. The method of claim 1, wherein the fusing of the spatiotemporal input stream of the image frames and the appearance-based stream of the image frames using the DNN comprises concatenating the spatiotemporal input stream of the image frames and the appearance-based stream of the image frames using the DNN with an early-fusion architecture in which the spatiotemporal input stream and the appearance-based stream are separately stacked, without individual processing, as inputs for object detection and trajectory prediction.

8. The method of claim 1, wherein the fusing of the spatiotemporal input stream of the image frames and the appearance-based stream of the image frames using the DNN comprises concatenating the spatiotemporal input stream of the image frames and the appearance-based stream of the image frames using the DNN with a late-fusion architecture in which the spatiotemporal input stream and the appearance-based stream are processed in two separate streams to create two separate sets of feature maps that are combined to form an input for object detection and trajectory prediction.

9. The method of claim 1, wherein the fusing of the spatiotemporal input stream of the image frames and the appearance-based stream of the image frames using the DNN comprises concatenating the spatiotemporal input stream of the image frames and the appearance-based stream of the image frames using the DNN with a slow-fusion architecture in which the spatiotemporal input stream and the appearance-based stream are processed separately for one or more layers before being combined to form an input for object detection and trajectory prediction.

10. The method of claim 1, wherein the fusing of the spatiotemporal input stream of the image frames and the appearance-based stream of the image frames using the DNN comprises fusing the spatiotemporal input stream of the image frames and the appearance-based stream of the image frames using recurrent neural networks (RNNs) with recurrent connections to utilize outputs from a previous video frame of the image frames as inputs to a current video frame of the image frames.

11. An apparatus implementable in a vehicle, comprising:
a processor capable of performing operations comprising:
receiving an input stream of image frames;
fusing a spatiotemporal input stream of the image frames and an appearance-based stream of the image frames using a deep neural network (DNN) to generate an augmented stream of the image frames; and
performing object detection and trajectory prediction of an object in the image frames based on the augmented stream,
wherein, in fusing the spatiotemporal input stream of the image frames and the appearance-based stream of the image frames, the processor fuses the spatiotemporal input stream of the image frames and the appearance-based stream of the image frames with either of a late fusion architecture and a slow fusion architecture, wherein the late fusion architecture involves:
processing the spatiotemporal input stream and the appearance-based stream through two separate stacks each comprising alternating convolutional layers and pooling layers to create two separate sets of feature maps; and
combining the two sets of feature maps, and wherein the slow fusion architecture involves:
processing each of the spatiotemporal input stream and the appearance-based stream individually through a convolutional layer and a pooling layer; and
further processing the spatiotemporal input stream and the appearance-based stream together through a single stack comprising alternating convolutional layers and pooling layers.

12. The apparatus of claim 11, further comprising:
one or more image sensors communicatively coupled to the processor, the one or more image sensors capable of capturing the image frames and providing the image frames as the input stream of image frames to the processor.

13. The apparatus of claim 11, wherein, in fusing the spatiotemporal input stream of the image frames and the appearance-based stream of the image frames using the DNN, the processor augments the appearance-based stream of the image frames with the spatiotemporal input stream of the image frames to generate the augmented stream of the image frames.

14. The apparatus of claim 11, wherein, in fusing the spatiotemporal input stream of the image frames and the appearance-based stream of the image frames using the DNN, the processor performs operations comprising:
generating, by the processor, the spatiotemporal input stream of the image frames from the received stream of the image frames; and
generating, by the processor, the appearance-based stream of the image frames from the received stream of the image frames.

15. The apparatus of claim 14, wherein, in generating the spatiotemporal input stream of the image frames, the processor performs either of:
generating the spatiotemporal input stream of the image frames using optical flow calculations and spatiotemporal filters; or
generating the spatiotemporal input stream of the image frames using a network stream which is adapted to extract motion information from the input stream of the image frames.

16. The apparatus of claim 11, wherein, in fusing the spatiotemporal input stream of the image frames and the appearance-based stream of the image frames using the DNN, the processor fuses the spatiotemporal input stream of the image frames and the appearance-based stream of the image frames using a convolutional neural network (CNN) that concatenates the spatiotemporal input stream and the appearance-based stream.

17. The apparatus of claim 11, wherein, in fusing the spatiotemporal input stream of the image frames and the appearance-based stream of the image frames using the DNN, the processor concatenates the spatiotemporal input stream of the image frames and the appearance-based stream of the image frames using the DNN with an early-fusion architecture in which the spatiotemporal input stream and the appearance-based stream are separately stacked, without individual processing, as inputs for object detection and trajectory prediction.

18. The apparatus of claim 11, wherein, in fusing the spatiotemporal input stream of the image frames and the appearance-based stream of the image frames using the DNN, the processor concatenates the spatiotemporal input stream of the image frames and the appearance-based stream of the image frames using the DNN with a late-fusion architecture in which the spatiotemporal input stream and the appearance-based stream are processed in two separate streams to create two separate sets of feature maps that are combined to form an input for object detection and trajectory prediction.

19. The apparatus of claim 11, wherein, in fusing the spatiotemporal input stream of the image frames and the appearance-based stream of the image frames using the DNN, the processor concatenates the spatiotemporal input stream of the image frames and the appearance-based stream of the image frames using the DNN with a slow-fusion architecture in which the spatiotemporal input stream and the appearance-based stream are processed separately for one or more layers before being combined to form an input for object detection and trajectory prediction.

20. The apparatus of claim 11, wherein, in fusing the spatiotemporal input stream of the image frames and the appearance-based stream of the image frames using the DNN, the processor fuses the spatiotemporal input stream of the image frames and the appearance-based stream of the image frames using recurrent neural networks (RNNs) with recurrent connections to utilize outputs from a previous video frame of the image frames as inputs to a current video frame of the image frames.

* * * * *